United States Patent

Grandinetti

[11] Patent Number: 4,890,447
[45] Date of Patent: Jan. 2, 1990

[54] CORN DETASSELER MACHINE

[76] Inventor: Dennis L. Grandinetti, 203 S. Fifth, Burlington, Iowa 52601

[21] Appl. No.: 354,704

[22] Filed: May 22, 1989

[51] Int. Cl.⁴ ............................................ A01D 45/02
[52] U.S. Cl. ........................................................ 56/63
[58] Field of Search .................... 56/63, 71, 52, 53, 56, 56/59, 60, 61, 500, 501

[56] References Cited

U.S. PATENT DOCUMENTS

| | | | |
|---|---|---|---|
| 3,712,035 | 1/1973 | Gildersleeve | 56/63 |
| 3,736,731 | 6/1973 | Hansen | 56/63 |
| 4,319,445 | 3/1982 | Coats | 56/63 |

FOREIGN PATENT DOCUMENTS 2846353  5/1980  Fed. Rep. of Germany .......... 56/63

*Primary Examiner*—Thuy M. Bui

[57] ABSTRACT

A machine and method for removing tassels from corn stalks comprising a blower positioned over the stalks as the machine advances over a field of corn and blows downwardly on the upper ends of each respective stalk to cause the upper leaves on the stalk to move downwardly from their normal disposition. Vertical wall structures are positioned outboard the stalks to momentarily prevent the leaves from regaining their normal disposition. Tassel-removing structure is provided between the wall structures for removing the tassel from each stalk while the stalk passes between the wall structure.

10 Claims, 4 Drawing Sheets

CORN DETASSELER MACHINE

This invention relates to a corn detasseling machine of the type that uses a rotary tassel removing device that grips and removes tassels from standing stalks. More particularly, it relates to such a machine and to structure that limits damage to the stalk and stalk leaves.

BACKGROUND OF THE INVENTION

In the production or growing of corn that will be marketed and used as seed corn, it is necessary to remove the tassels from the rows of corn when they first sprout or appear on the stalks. For purposes of desired pollinization of the corn, the removal normally occurs in a plurality of rows and the tassels are not removed from selected single rows. The complete removal of the tassels in the respective rows is most important because inadvertent leaving of tassels will result in poor quality seed corn in the nearby stalks. This reduces the overall quality of the seeds.

In detasseling, it is also desirable to do the minimum damage to the stalks and the leaves on the stalks. The reason is that the yield of corn on the stalks that are being detasseled is greatly reduced if the upper stalk and its leaves are removed or damaged. For example, it has been determined that in some varieties of seed corn the breaking or removal of the uppermost leaf of a stalk will reduce the yield by 6%. Removing or breaking the next upper leaf may reduce the yield by another 12%, and the removal or breakage of the next upper leaf may reduce the yield by another 18%. Thus, damaging the upper portion of the stalk and its leaves may reduce yields by one-third.

The preferred method of detasseling is by hand. This is done by a person walking or being carried on a machine so as to advance over a field between the rows of corn and manually reaching and pulling the respective tassels from each stalk. The advantage of such a method is that it is very accurate with respect to totally removing all the tassels. It also results in very little damage to the remaining stalk and particularly the leaves on the stalks. The disadvantage of such system lies in the cost of labor that is required.

Mechanical detasselers are also used in removing tassels. These consist of units for respective rows of corn that are mounted on vehicles to move over the rows of corn generally at the heights of the tassels. The detasseling units themselves may take various forms. One form consists of structure that guides the respective stalks into and between a pair of cooperating rolls that grasp and pull the tassels from the stalks. This form of detasseling gives the advantage of lower labor costs but has the disadvantage of accuracy with respect to the removal of all tassels. It must, in most instances, be followed up by manual detasseling so as to remove the remaining tassels. Also, damage is often done to the leaves on the stalks and particularly the upper leaves, all of which reduces the yields of the corn then being grown.

Another form of mechanical detasseler is through the use of cutters that cut off the upper portions of the stalks, including the tassels, as the tractor or vehicle advances. This offers the advantage of minimal labor costs. However, much harm or damage is done to the upper portions of the stalks and particularly the upper leaves which reduces the yields of the corn on the stalk.

SUMMARY OF THE PRESENT INVENTION

With the above in mind, it is the primary object of the present invention to provide a mechanical detasseling machine that is accurate in removing the tassels and which causes a minimum amount of damage to the remaining stalks on the plants.

It is a further object of the invention to provide structure that feeds or guides stalks to a rotary-type mechanical tassel remover. However, prior to reaching the tassel remover, the leaves on the upper portion of the stalks are gently moved downwardly and away from the stalk as compared to their normal disposition and held in such disposition as the tassels are removed. The leaves are then permitted to regain their normal disposition. This results in two advantages. First, it insures that the leaves will not be present as the tassel remover removes the tassel which could cause the retention of the tassel on the stalk. Second, since the upper leaves are held out of contact with the mechanical tassel remover, there will be little damage to the leaves and stalks thereby providing a higher yield of corn on the respective stalks being detasseled.

More particularly, it is an object of the invention to provide a detasseling unit that includes a mechanical rotary tassel remover in a rearward disposition with respect to a downwardly directed stream of air issuing from an air nozzle positioned over the stalks and which blows the upper leaves on the stalks downwardly from their normal upwardly directed disposition. Positioned on opposite sides of the upper portions of the corn stalks are a pair of upright walls that extend from the rotary tassel remover forwardly to ends just rearwardly of the stream of air and which blocks the stalk leaves from regaining their normal disposition until after the stalk moves through the area of the rotary tassel remover. Following the removal of the tassels, the leaves are free to return to their normal disposition and little damage is done to the total plant.

A further object of the invention is to provide a method for removing tassels from corn stalks comprising the steps of moving over a row of tasseled corn stalks; directing a stream of air downwardly on each successive stalk so as to blow the upper leaves on the stalk downwardly and outwardly from their normal dispositions; blocking the leaves from re-establishing their normal dispositions; and removing the tassel from the stalk while the leaves are so blocked.

DESCRIPTION OF THE INVENTION

Figure 1:
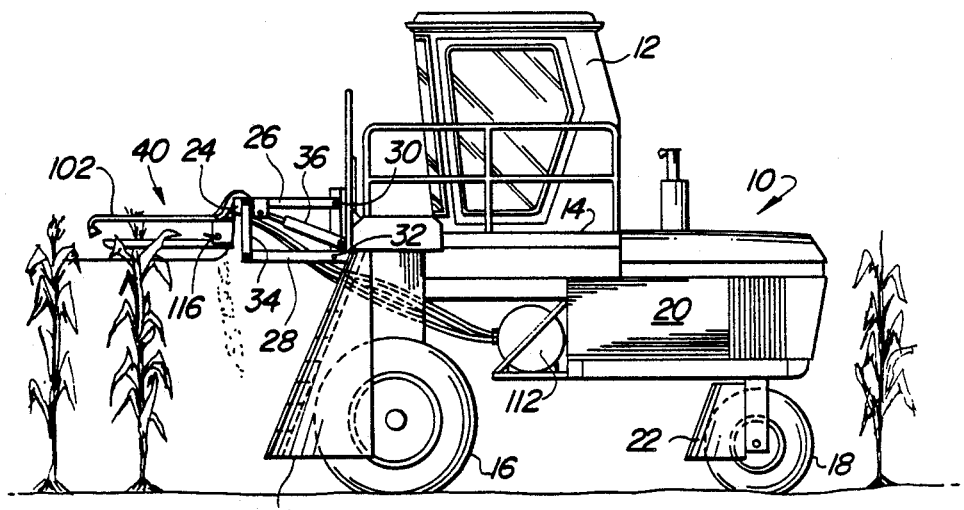
FIG. 1 is a side view of a detasseling machine using the row units of the present invention.
Figure 2:
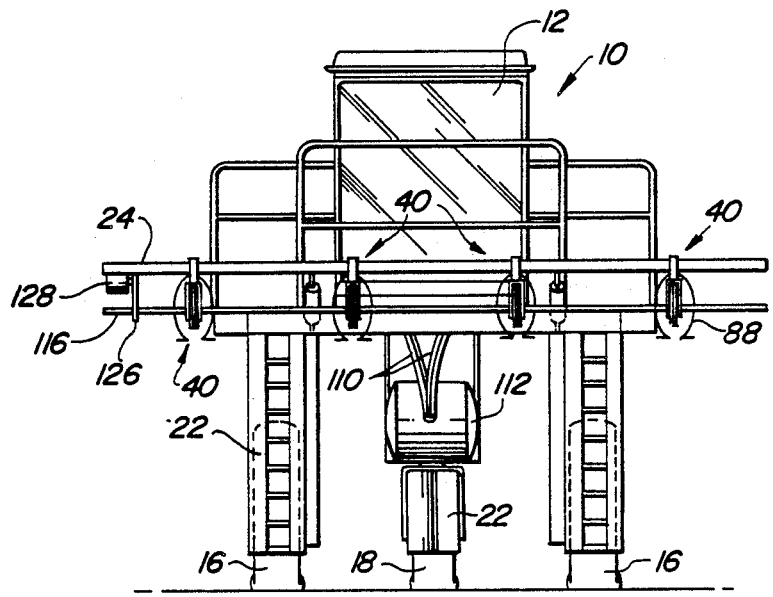
FIG. 2 is a front view of the machine shown in FIG. 1.

Referring now to FIGS. 1 and 2, a detasseling machine includes a tractor 10 having an operator's station 12 carried on a platform 14. The tractor 10 is supported at its front by a pair of traction wheel 16 and at its rear by steerable wheels 18. An engine, not shown, is carried on the tractor frame and within a housing 20. As can best be seen from viewing FIG. 2, the wheels 16 and 18 normally move between rows of corn. Fenders or stalk guides 22 are positioned forwardly of the wheels 16, 18 and serve to prevent the corn stalks from contacting the wheels. A transverse toolbar 24 is carried on the tractor frame or supporting structure by a pair of parallel linkages, each of the linkages being composed of upper and lower parallel links 26, 28 pivotally mounted at 30, 32, respectively, at their rear ends on the tractor. The links 26, 28 are connected at their forward ends by vertical links 34 so that each set of links form with the tractor portion between pivots 30, 32 a parallel linkage. Power means in the form of hydraulic cylinders 36 extends between the tractor and the upper links 26. As is clearly apparent from viewing FIG. 1, extension and retraction of the cylinders 36 raises and lowers, respectively, the toolbar 24. While the exact manner of raising the toolbar is not important for purposes of this invention, it should be understood that the toolbar 24 and the means supporting the detasseler row unit for vertical adjustment is important, since such is required to adjust the units vertically, while retaining the row units 40 horizontal, to accommodate different varieties of corn that have tassels at various heights.

For purposes of the present description, the toolbar 24 extends transversely over four rows of corn, it being understood that it could be of a width covering fewer or more rows, if desired. Mounted on the toolbar are four tassel-removing row units 40. Each row unit is provided with rear supports comprised in part of a L-shaped flat-stock bracket 42 having a vertical leg portion 44 that is clamped at 46 to the toolbar 24. The bracket 42 has a forwardly extending and horizontal leg portion 48 that extends over and is welded at 52 to a horizontal wall 50 of a downwardly opening U-shaped bracket 54 that forms a further part of the rear support. The bracket 54 has opposed vertical walls 56, 58 joined by the horizontal wall 50. The forward edges of walls 50, 56, 58 are rounded. A pair of fore-and-aft extending vertical walls or plates 70, 72 are fixed by bolts 66 to the vertical walls 56, 58 and extend generally in cantilever fashion forwardly to free ends. The bolts 66 are machine threaded and are received in threaded openings in walls 56, 58. The bolts 66 have tapered heads to be received in countersunk-type holes in the walls or plates 70, 72. Thus, both the inner and outer surfaces of plates 70, 72 are smooth and the bolts 66 offer minimum obstructions to corn stalks and stalk leaves as they pass adjacent them. Lower edges 74, 76 of plates 70, 72 are curved downwardly and inwardly. Also, on the surfaces of the plates 70, 72 are generally horizontal ribs 78 that have curved forward ends directed downwardly. The lower edges 74, 76 of plates 70, 72 or walls 70, 72 are curved and sweep upwardly at the forward ends of the plates to join with the upper edges of the plates. A striker plate 60, having a groove 62 at its lower forward side, extends transversely between and is fixed to plates 70, 72 at the end portions. The upper forward portion of striker plate 60 arches rearwardly at 64.

Figure 4:
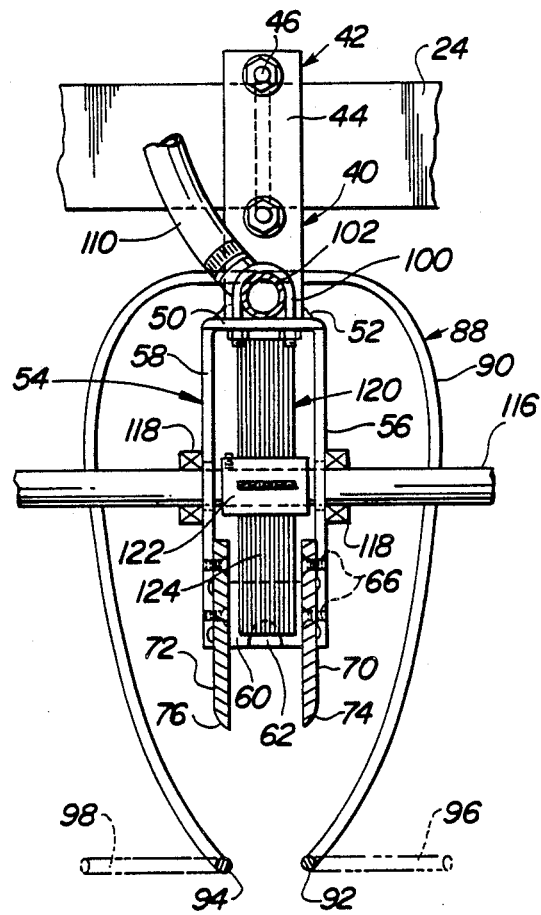
FIG. 4 is a vertical sectional view of the unit taken along the line 4—4 in FIG. 3.
Figure 5:
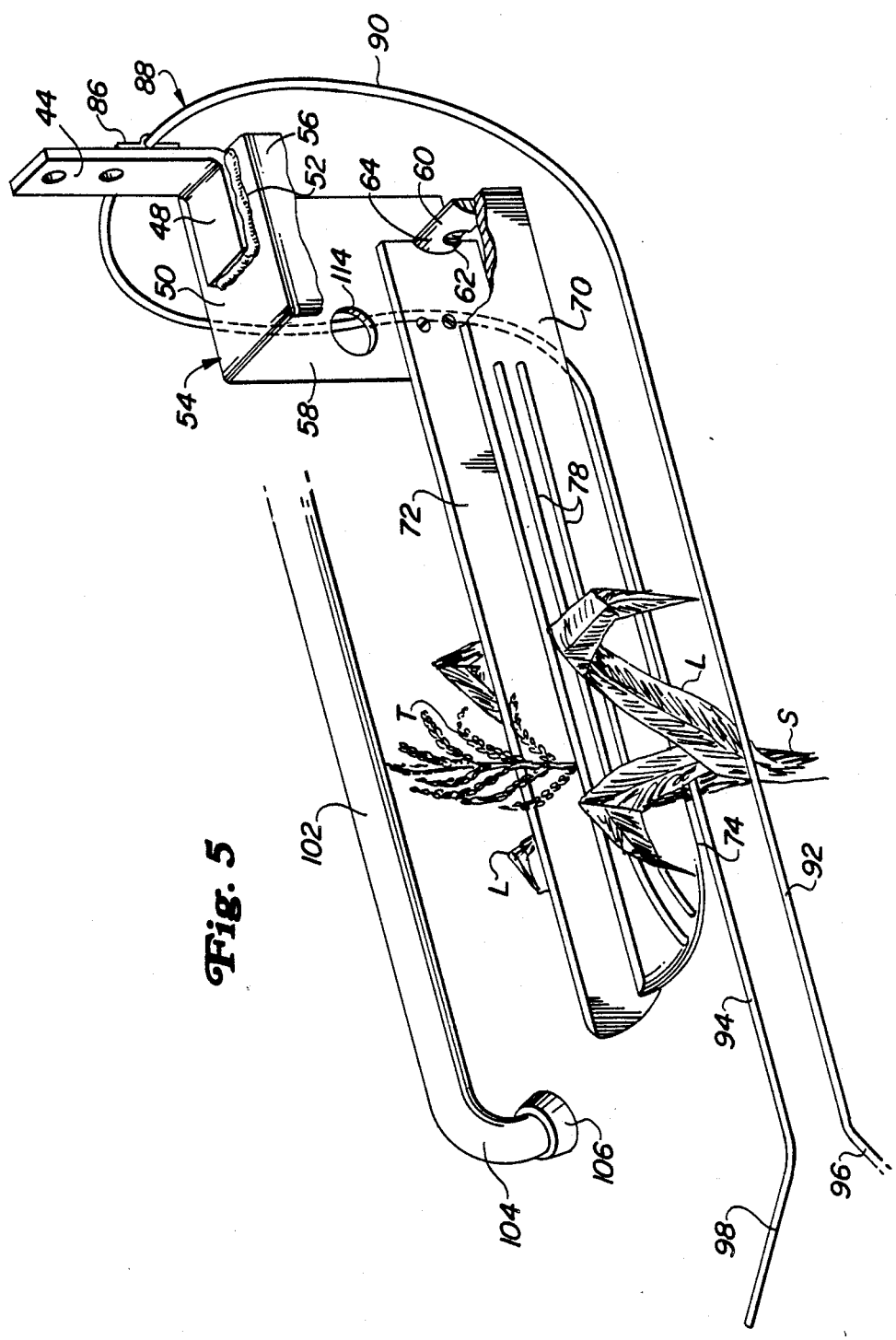
FIG. 5 is a perspective view shown partially in section of the row unit and with portions thereof removed for purposes of clarity.

Clamped at 86 on the vertical bracket portion 44 is a stalk guide rod 88. The rod 88 is composed of a rearwardly positioned vertical loop portion 90 having its uppermost section or part extending through the clamp 86. The upper part is joined to two continuing outwardly curved parts that extend first outwardly and downwardly with respect to plates 70, 72 and then inwardly and downwardly to join with forwardly projecting horizontal rod portions 92, 94. As best shown in FIGS. 4 and 5, the horizontal rod portions are generally parallel and spaced beneath the lower edges 74, 76 of plates 70, 72. The rod portions 92, 94 extend forwardly beyond the forward ends of plates 70, 72 and flare outwardly at forward end portions 96, 98, respectively, to opposite sides of the respective stalk row.

Fixed by clamp 100 to the horizontal wall 50 of bracket 54 is a rigid air conduit 102. A forward end 104 of the conduit is bent downwardly and carries at that end an adjustable nozzle 106 through which air is discharged in a downward direction. The rear end of the conduit 102 is joined by fitting 108 to a flexible hose 110 that extends to an air compressor tank 112. The nozzle 106 is positioned just forwardly of the plates 70, 72 so that air leaving it will contact stalks just prior to their entering the area of plates 70, 72.

Figure 3:
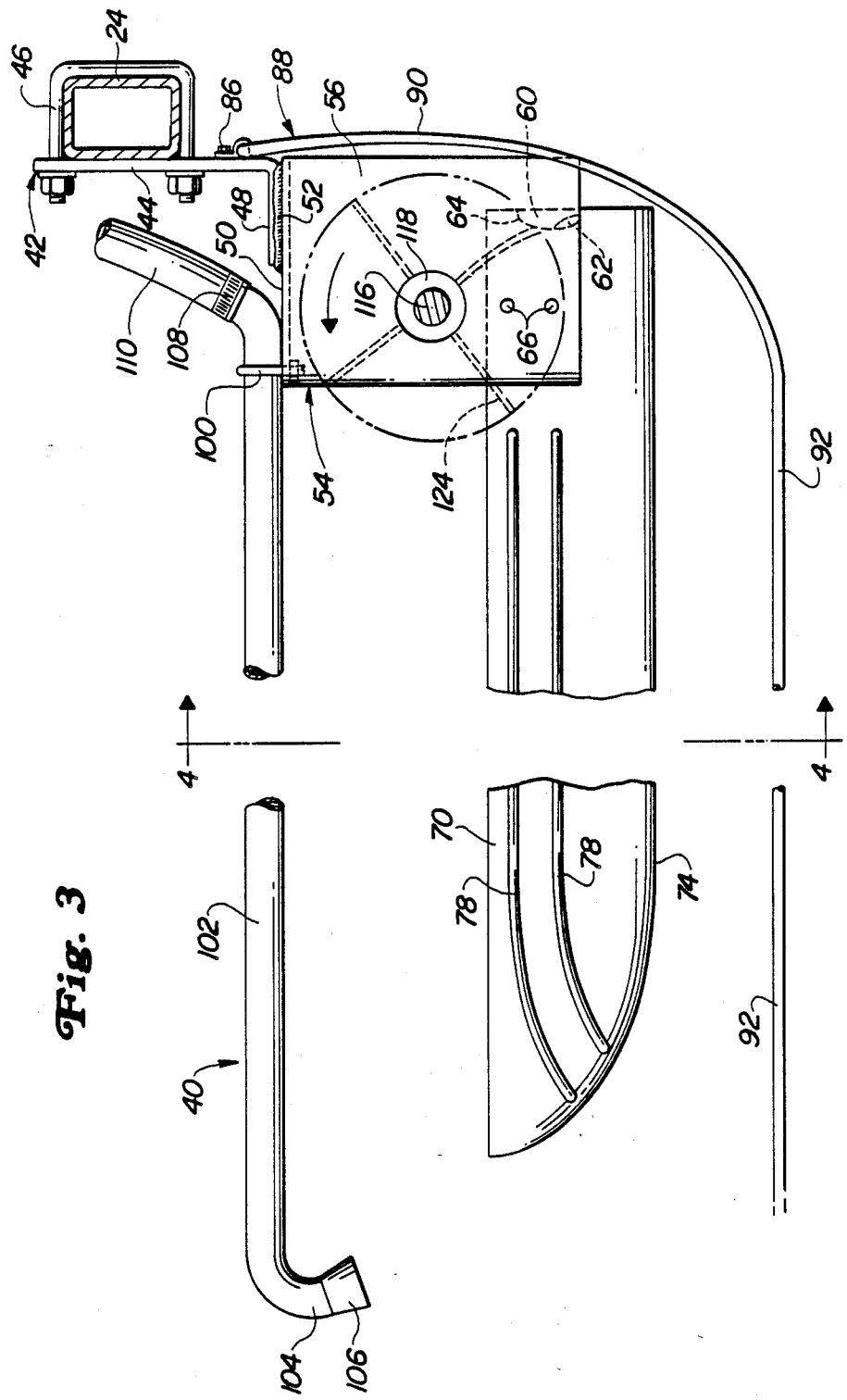
FIG. 3 is an enlarged side view of a row unit using the features of the present invention.

The side walls 56, 58 of bracket 54 are provided with transverse horizontally aligned openings 114 (FIG. 5) through which a single driven shaft 116 extends. The shaft 116 extends through all four units and is coupled by a transmission 126 to a rotary-type hydraulic motor 128 carried on the toolbar 24. Suitable bushings 118 are mounted on the walls 56, 58 at the openings 114 for the shaft 116. Mounted on the shaft 116 between each pair of walls 56, 58 is a paddle wheel 120 composed of radially extending flexible arms in the form of rubber flaps 124 carried on a hub 122 that is fixed to the shaft. As can best been seen in FIG. 3, when the shaft 116 is driven, the ends of flaps 124 strike the striker plate 60.

The structure of the invention operates in the following manner. The tractor 10 will advance over a field normally carrying four detasseling units 40. It is necessary that units be aligned with four rows of corn. To accommodate different spacings between the rows, the clamps 46 may be loosened and the units 40 may be repositioned on the toolbar to the desired spacing. The vertical position of the units 24 is important. It is desired that the tassels on the stalks have their lower portions at the height of the striker bar 60. To this end, the hydraulic cylinders 36 may be adjusted. The parallel linkages 26, 28 in conjunction with the cylinders will maintain the units 24 in a horizontal disposition regardless of the vertical position of those units.

As the tractor advances, the flared ends 96, 98 of rods 92, 94 will first contact the stalks and move them into vertical alignment with the spacing between plates 70, 72. This will properly position stalks that may be leaning or slightly out of line with the row. Just prior to a stalk entering into the gap between plates 70, 72, it will pass under the nozzle 106. The air pressure from the nozzle will cause the upper leaves on the stalks to spread outwardly. Before the leaves can reposition themselves after leaving the nozzle, the upper portion of the stalk is in the confines of the plates 70, 72 and the leaves are retained outboard of the plates. The tassel on the stalk is also confined between the plates 70, 72 and, as the tractor continues its advance, the tassel moves toward contact with the striker plate 60. The groove 62 will help to center the tassel so that when a rubber flap 122 contacts the tassel, it will catch the tassel between the flap and striker bar and pull the tassel from the stalk.

The sides of loop portion 90 of guide rod 88 are sufficiently spaced outwardly from the plates 70, 72 so that the leaves on the upper portion of the stalk may pass inwardly of the loop sides with little or no damage to them. Once the stalk has left the area of the unit 24, the stalk leaves may reposition themselves to their normal disposition. The uppermost leaf on the stalk is known as the "flag" leaf. It is often not completely open and tends to cling to and lay against the upper end of the stalk. The ribs 78, the forward ends of plates 70, 72, and the lower rounded inclined edges 74, 76 of plates 70, 72 serve the purpose of contacting the flag leaves and other partially opened leaves, opening many of them, and guiding them outboard of plates 70, 72.

The guide rods 92, 94 must be sufficiently spaced beneath the edges 74, 76 so that there is sufficient spacing to permit the upper leaves of the stalks to extend outwardly of the plates 70, 72. Referring to FIG. 5, it will be noted that the tassel, indicated by the letter T on the stalk S passes between the plates 70, 72 and the upper leaves L pass outwardly of the plates. The leaves also extend from stalk S to project between the respective horizontal guide rod sections 92, 94 and the lower edges 74, 76 of plates 70, 72. The front tapered edges of the U-shaped bracket 50 will gently guide the leaves L slightly outwardly but will provide a smooth surface on the U-shaped bracket that will do no harm to the leaves. Thus, as the stalks leave the confines of the plates 70, 72, the tassel T will be removed with little or no damage done to the upper leaves L on the stalk.

I claim:

1. A detasseling machine for removing tassels from corn stalks planted in rows, comprising: a mobile vehicle movable forwardly over a field of corn; a main transverse supporting structure mounted on the vehicle and extending transversely over the expanse of several rows of corn; a plurality of detasseling units supported on said supporting structure generally at the height of tassels on corn stalks and in alignment with a row of corn stalks, each detasseling unit comprising a pressurized air-carrying conduit terminating in a discharge nozzle positioned above a respective row of corn and directing a downwardly directed stream of air onto the upper portion of each stalk for moving the upper leaves on the stalk downwardly and outwardly from their normal disposition, each detasseling unit further including a pair of opposed fore-and-aft extending vertical wall members positioned on opposite sides of and for passing between them the upper portions of a row of stalks, said wall members having forward ends adjacent the nozzle so as to receive the respective tassels and upper portions of the stalks as they pass from under said stream of air and prior to the leaves regaining their normal disposition, and said walls having lower edges generally at the height of but vertically above the upper leaves of the respective stalks so that said leaves are blocked from regaining their normal disposition as the stalks pass between said wall members; each detasseling unit further including a tassel removing structure at the rear portions of the walls that engage and remove the tassels from the respective stalks as they pass between the wall members; and stalk gathering means projecting forwardly of and positioned beneath the wall members for engaging the stalks in the row and guiding the stalks to pass between the wall members as the vehicle advances.

2. The invention defined in claim 1 in which said detasseling units are mounted on said transverse supporting structure by means permitting transverse adjustment of said units on said supporting structure so as to accommodate the positioning of said units to different transverse spacings between rows of corn.

3. The invention defined in claim 1 in which said transverse supporting structure includes a toolbar, parallel linkage means supporting it on the vehicle, and power means for vertically adjusting the linkage means and toolbar whereby said units may be adjusted in unison without effecting their desired horizontal dispositions.

4. The invention defined in claim 1 in which the stalk gathering means includes rod structure having a pair of parallel rod sections spacedly beneath and parallel to said lower edges of said wall members and having continuing outwardly flaring rod sections connecting with the respective parallel sections forwardly of said forward ends of said wall members to gather inwardly leaning stalks and stalks otherwise out of the general plane of the respective row.

5. A corn detasseling unit adapted to move forwardly over a row of corn stalks comprising: a rear support adapted to be mounted on a vehicle at a height generally above the stalks; a pair of opposed vertical and parallel fore-and-aft extending wall structures having rear and front ends and mounted at their rear ends on said rear support and extending forwardly therefrom generally at the height of upper end portions of stalks that pass between them as the unit is advanced; an air conduit mounted on said rear support spacedly above said parallel wall structures and extending forwardly to a downwardly directed air discharge nozzle located above and slightly forwardly of said forward ends of said wall structures; rod means carried by said rear support and having a pair or parallel horizontal rod sections extending forwardly in vertically spaced relations beneath the wall structures, and forward rod sections joined with the respective said horizontal rod sections and flaring outwardly forwardly of said forward ends of said wall structures so as to guide stalks in the respective row of corn to pass between said wall structures; and a tassel removing device carried by said rear support at said rear ends of said wall structures removing tassels from the upper ends of the stalks as they pass between said wall structures.

6. The invention defined in claim 5 in which said rod means has a vertically and transversely extending looped rear end section with an upper part fixed to said rear support and joined with two continuing outwardly curved parts extending first outwardly and downwardly with respect to the side wall structures and then inwardly and downwardly to join with the horizontal rod sections whereby leaves on the stalks outboard of said wall structures will pass clearly and uninterrupted outboard of the wall structures as the upper portion of the stalks pass between said wall structures and through said corn detasseling unit.

7. The invention defined in claim 5 in which the wall structures are a pair of vertical and opposed plates having lower horizontal edges substantially the main length of the respective plates and curving upwardly and forwardly at the forward ends of the plates to join the upper edges of the respective plates.

8. The invention defined in claim 7 further characterized by said plates having rib strips projecting from the outer surfaces thereof, said ribs having horizontal sections generally above said lower horizontal edge and forward downwardly sweeping sections extending substantially to said forward ends of said plates.

9. The invention defined in claim 5 in which the rear support includes a downwardly opening U-shaped bracket centrally positioned to have a horizontal portion of the racket above a row of corn to be detasseled and depending walls portions descending downwardly from the horizontal portions for positioning on opposite sides of the row of corn to be detasseled, and the aforesaid fore-and-aft extending wall structures are fixed at their rear ends to said respective wall portions.

10. A method of removing tassels from corn stalks comprising the steps of: moving over a row of tasseled corn stalks; directing a stream of air downwardly on each successive stalk so as to blow the upper leaves on the stalk downwardly from their normal disposition; blocking said leaves momentarily as they move from under the effect of the stream of air from reestablishing their normal dispositions; removing the tassel from the stalks while the leaves are so blocked; and permitting said leaves to regain their normal disposition after the tassel is removed.

* * * * *